(12) United States Patent
Xiong et al.

(10) Patent No.: US 10,823,233 B2
(45) Date of Patent: Nov. 3, 2020

(54) OVERLOAD PROTECTION ASSEMBLY

(71) Applicant: UBTECH Robotics Corp, Shenzhen (CN)

(72) Inventors: Youjun Xiong, Shenzhen (CN); Xuchao Du, Shenzhen (CN); Yongfeng Wu, Shenzhen (CN); Hongyu Ding, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 16/232,086

(22) Filed: Dec. 26, 2018

(65) Prior Publication Data

US 2020/0018358 A1    Jan. 16, 2020

(30) Foreign Application Priority Data

Jul. 12, 2018 (CN) .......................... 2018 1 0764090

(51) Int. Cl.
| | |
|---|---|
| *F16D 7/00* | (2006.01) |
| *B25J 9/00* | (2006.01) |
| *F16H 35/10* | (2006.01) |
| *H02P 29/00* | (2016.01) |
| *H02P 29/024* | (2016.01) |

(52) U.S. Cl.
CPC ............ *F16D 7/002* (2013.01); *B25J 9/0009* (2013.01); *F16H 35/10* (2013.01); *H02P 29/0027* (2013.01); *H02P 29/027* (2013.01)

(58) Field of Classification Search
CPC ................................ B25J 19/068; F16D 7/002
See application file for complete search history.

(56) References Cited

U.S. PATENT DOCUMENTS

| | | | | | |
|---|---|---|---|---|---|
| 4,702,122 | A | * | 10/1987 | Richard ................. | F16D 7/021 |
| | | | | | 192/56.1 |
| 5,242,154 | A | * | 9/1993 | Schmidt ............... | B62D 43/045 |
| | | | | | 254/323 |
| 5,601,491 | A | * | 2/1997 | Chan ...................... | F16D 7/048 |
| | | | | | 192/56.1 |
| 5,899,811 | A | * | 5/1999 | Kishibuchi .......... | F04B 27/0895 |
| | | | | | 464/30 |
| 10,088,804 | B2 | * | 10/2018 | Cusin ................... | G04B 11/028 |
| 2002/0000135 | A1 | * | 1/2002 | Zaps ....................... | F16D 7/04 |
| | | | | | 74/411 |
| 2004/0198499 | A1 | * | 10/2004 | Kamdem .................. | F16D 3/58 |
| | | | | | 464/75 |

(Continued)

*Primary Examiner* — Howard J Sanders
*Assistant Examiner* — Gregory T Prather (57) ABSTRACT

An overload protection assembly includes a first gear of a servo, a second gear of the servo, defining a receiving space; and a clutch configured to coaxially couple the first gear to the second gear and transmit torque between the first gear and the second gear. The clutch includes an elastic member arranged around the first gear and received in the receiving space. The elastic member includes a number of protrusions at a circumferential surface thereof, and a number of recesses are defined in a lateral surface of the receiving space. The protrusions are used to be respectively engaged with corresponding ones of the recesses so as to couple the firs gear to the second gear when a value of the torque is less than a preset value, and disengageable from the corresponding ones of the recesses so as to disconnect the first gear.

8 Claims, 10 Drawing Sheets

(56) References Cited

U.S. PATENT DOCUMENTS

| | | | | |
|---|---|---|---|---|
| 2009/0133980 A1* | 5/2009 | Swaim | ............... | F16D 7/002 |
| | | | | 192/45.1 |
| 2009/0149109 A1* | 6/2009 | Yoneda | ............ | B25J 9/1615 |
| | | | | 446/90 |
| 2011/0009198 A1* | 1/2011 | Yang | ............ | F16D 7/002 |
| | | | | 464/46 |
| 2013/0237328 A1* | 9/2013 | Billings | ............ | F16D 7/002 |
| | | | | 464/37 |
| 2014/0157926 A1* | 6/2014 | Fujisawa | ............ | F16H 35/10 |
| | | | | 74/421 R |
| 2015/0376929 A1* | 12/2015 | Scheuring | ............ | F16H 25/24 |
| | | | | 74/89.38 |
| 2016/0346909 A1* | 12/2016 | Victor | ............ | F16D 7/002 |
| 2019/0390755 A1* | 12/2019 | Shan | ............ | F16H 49/001 |

* cited by examiner

OVERLOAD PROTECTION ASSEMBLY

CROSS REFERENCE TO RELATED APPLICATIONS

This application claims priority to Chinese Patent Application No. 201810764090.X, filed Jul. 12, 2018, which is hereby incorporated by reference herein as if set forth in its entirety.

BACKGROUND

1. Technical Field

The present disclosure generally relates to robots, and particularly to an overload protection assembly for a servo of a robot.

2. Description of Related Art

Many conventional servos used for joints of robots include an overload protection module to protect the servos from mechanical overload. One conventional overload protection module cuts off current of motor of a servo when it detects that the current exceeds a preset value. One problem with such overload protection module is that when an instantaneous mechanical overload occurs, the overload protection module cannot protect the servo. The reason is that the instantaneous mechanical overload occurs in an extremely short time that is less than the time required for detection of the rising of current and response to the detection of the rising of current, which means that the servo has been damaged because the servo has no enough time to cut off the current after the instantaneous mechanical overload occurs.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 1:
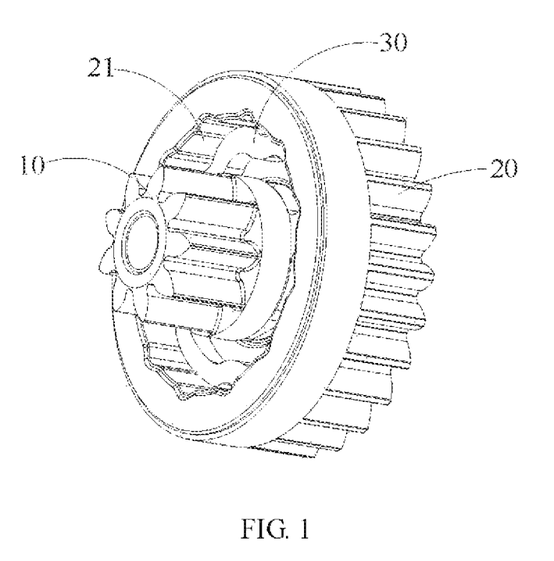
FIG. 1 is an isometric view of an overload protection assembly according to an embodiment.
Figure 2:
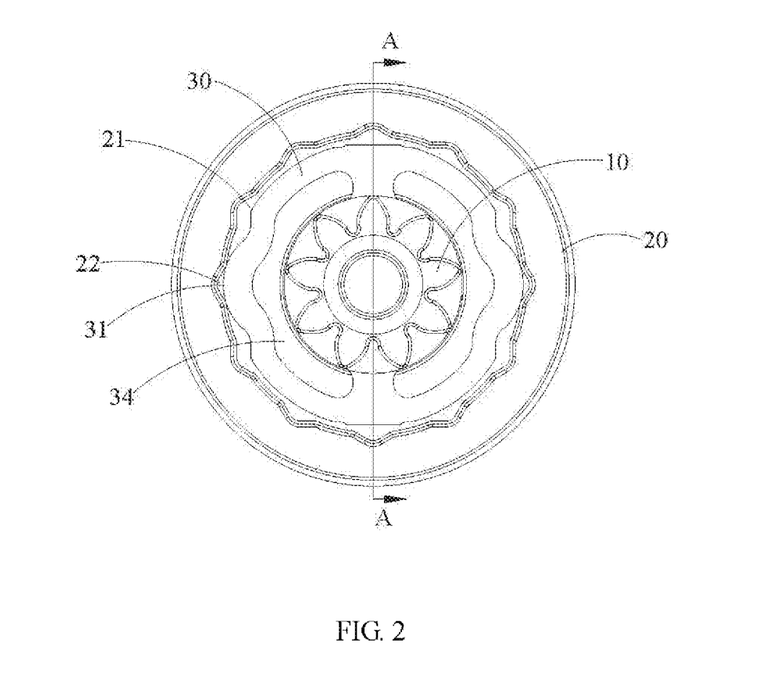
FIG. 2 is a planar front view of the overload protection assembly of FIG. 1.

Referring to FIGS. 1-2, an overload protection assembly according to an exemplary embodiment is used for a servo of a robot. The overload protection assembly is a part of a speed reduction assembly that is connected to a motor of the servo. The overload protection assembly includes a first gear 10, a second gear 20 defining a receiving space 21, and an independently-formed clutch to coaxially couple the first gear 10 to the second gear 20 and transmit torque between the first gear 10 and the second gear 20. The clutch includes an elastic member 30 arranged around the first gear 10 and received in the receiving space 21. The elastic member 30 includes a number of protrusions 31 at a circumferential surface thereof. A number of recesses 22 are defined in a lateral surface of the receiving space 21. The protrusions 31 are respectively engaged with corresponding ones of the recesses 22 so as to couple the firs gear 10 to the second gear 20 when a value of the torque is less than a preset value. The protrusions 31 are disengageable from the corresponding ones of the recesses 22 so as to disconnect the first gear 10 from the second gear 20 when the value of the torque is more than the preset value.

With such configuration, when the servo operates at nominal load, the first gear 10 is connected to the second gear 20 through the clutch and can rotate synchronously together with the second gear 20. When the torque transmitted between the first gear 10 and the second gear 20 exceeds the preset value, caused by large instantaneous current surge of the motor, large output force exerted on the output shaft of the motor or sudden fall of the robot, the clutch will rotate with respect to the second gear 20. The first gear 10 is then disconnected from the second gear 20, which avoid the damage of the two gears and other parts connected to them.

Figure 3:
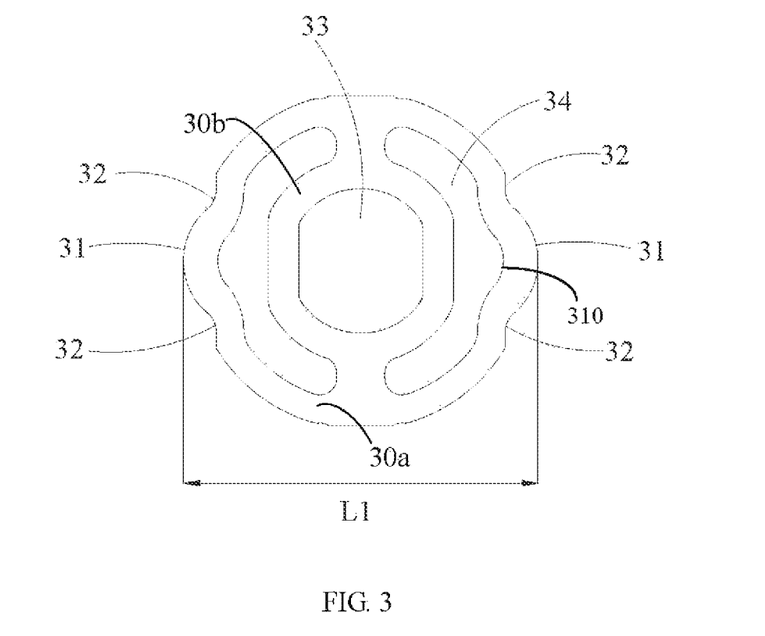
FIG. 3 is a planar front view of an elastic member of the overload protection assembly of FIG. 1.
Figure 4:
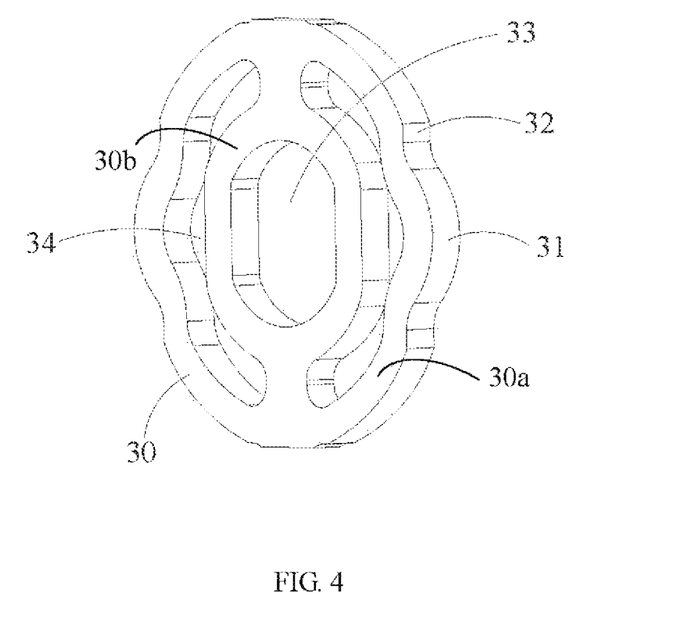
FIG. 4 is an isometric view of the elastic member of FIG. 3.
Figure 5:
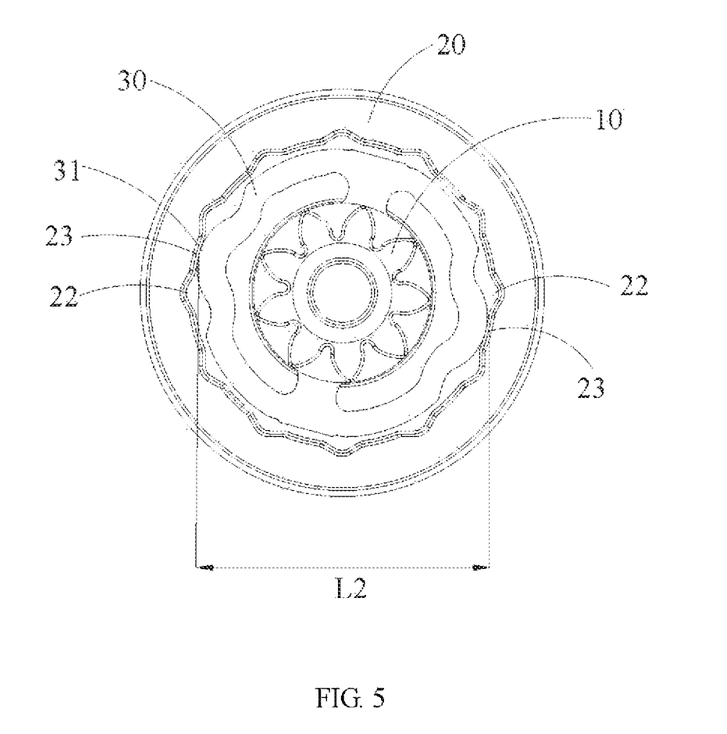
FIG. 5 is similar to FIG. 2, but showing that the elastic member has rotated for a certain angle.

Referring to FIGS. 3-5, the elastic member 30 is hollow and include an outer ring 30a and an inner ring 30b connected to inner surface of the outer ring 30a and defining a through hole 33. The outer ring 30a is coaxial with the inner ring 30b. The inner ring 30b is securely connected to the first gear 10. The number of the protrusions 31 is two and the number of the recesses 22 is twelve. The two protrusions 31 are formed at the circumferential surface of the outer ring 30a and symmetrical with respect to the axis of the through hole 33. The two recesses 22 are symmetrical with respect to the axis of the receiving space 21. In the embodiment, the receiving space 21 has a cylindrical lateral surface.

Referring to FIGS. 2 and 5, viewed along the axis of the receiving space 21, the recesses 22 are arc-shaped and is curved away from the axis of the receiving space 21. Each of the protrusions 31 includes an outer surface connected to the circumferential surface of the clutch via an arc surface that is curved toward a center of the clutch. The protrusions 31 are arc-shaped and curved away from the axis of the outer ring 30a. Each protrusion defines a concavity 310. With such configuration, it facilitates the deformation of the elastic member 30 and rotation of the elastic member 30 in the receiving space 21. The protrusions 31 are initially engaged with two corresponding recesses 22 and deformed so as to allow synchronous rotation of the first gear 10 and the second gear 20. When the torque transmitted between the first gear 10 and the second gear 20 exceeds a preset value, the protrusions 31 move out of their original recesses 22 toward adjacent recesses 22. When the protrusions 31 move out of their original recesses 22 and come into contact with the cylindrical lateral surface of the receiving space 21, they are further deformed until moving into the adjacent recesses 22. The protrusions 31 will keep moving in and out of the recesses 22 during the whole overload period.

Referring back to FIG. 3, the maximum distance L1 between the two protrusions 31 of the elastic member 30 in a natural undeformed state is greater than the diameter L2 of the cylindrical lateral surface of the receiving space 21. As a result, when the elastic member 30 is inserted into the receiving space 21 it is deformed. When the torque transmitted between the first gear 10 and the second gear 20 exceeds a preset value, the protrusions 31 move out of their original recesses 22 toward adjacent recesses 22. When the protrusions 31 move out of their original recesses 22 and come into contact with the cylindrical lateral surface of the receiving space 21, they are further deformed until moving into the adjacent recesses 22. The protrusions 31 will keep moving in and out of the recesses 22 during the whole overload period. The elastic member 30 and the first gear 10, as a whole, will rotate with respect to the second gear 20, which avoid the damage of the two gears and other parts connected to the them.

Referring to FIGS. 3 and 4, each protrusion 31 includes an outer surface connected to the circumferential surface of the clutch via two arc surfaces 32 that are curved toward a center of the clutch. With such configuration, on the one hand, it facilitates the deformation of the elastic member 30 in the radial direction; on the other hand, under a certain compression amount, the elastic force of the elastic member 30 can be controlled within a small range, which is conducive to the consistency of slipping torque.

In the embodiment, the number of the protrusions 31 is two and the two protrusions are symmetrically arranged. The number of the recesses 22 is twelve and the recesses 22 are evenly arranged in the cylindrical lateral surface of the receiving space 21. With such configuration, when assembled, the elastic member 30 can be arbitrarily fixed between any two opposing recesses 22 without the need for alignment at a specific angle. It should be noted that the number of the recesses 22 can vary according to need.

Referring back to FIG. 3, the outer ring 30a and the inner ring 30b corporately define two closed grooves 34 therebetween. The grooves 34 are located inside the protrusions 31, which allows the protrusions 31 to deform radially toward the center of the elastic member 30. Furthermore, the provision of two grooves 34 facilitates the reduction of weight of the elastic member 30.

Figure 7:
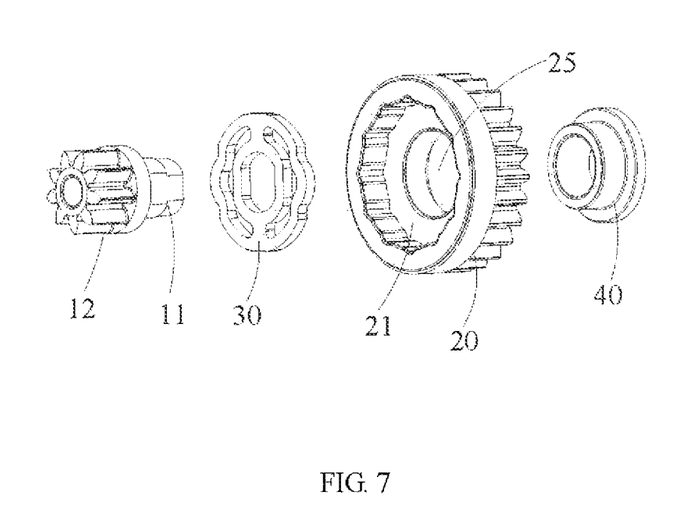
FIG. 7 is an isometric exploded view of the overload protection assembly of FIG. 1.

Referring to FIG. 7, in one embodiment, the first gear 10 includes a gear portion 12 and a shaft 11 connected to an end of the gear portion 12. A through hole 25 is defined in a bottom of the receiving space 21. The inner ring 30b is securely arranged around the shaft 11, and the shaft 11 pass through the through hole 33 of elastic member 30 and received in the through hole 25.

In the embodiment, the through hole 33 of the elastic member 30 have two parallel planar surfaces opposing each other and two semicylindrical surfaces connected to each other via the two planar surfaces. The cross section of the shaft 11 of the first gear 10 is shaped according to the through hole 33. The shaft 11 can thus fit into the through hole 33 exactly, which can prevent rotation of the shaft 11 with respect to the elastic member 30.

Figure 6:
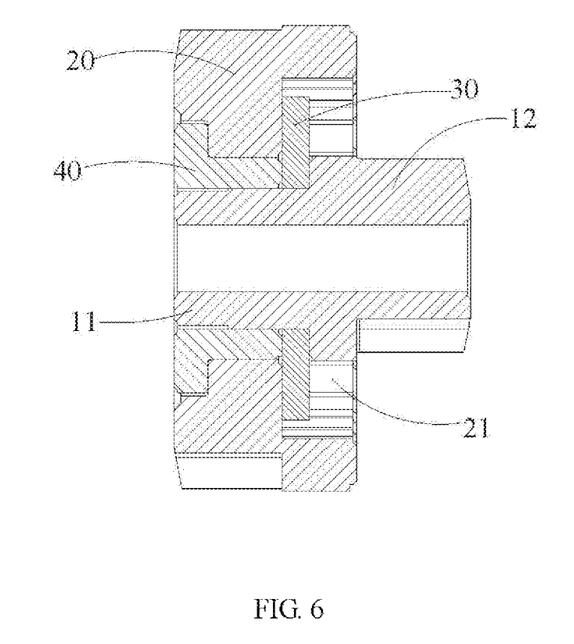
FIG. 6 is a planar cross-sectional view of the overload protection assembly, taken along line A-A of FIG. 2.

Referring to FIGS. 6 and 7, in one embodiment, the overload protection assembly further includes a connection member 40. The through hole 25 is a stepped hole and the connection member 40 is securely arranged around the shaft 11 of the first gear 10 and is shaped and sized according to the through hole 25 such that the connection member 40 can fit in the through hole 25. The connection member 40 is used to prevent the first gear 10 from axially disengaging from the second gear 20. When assembled, the first gear 10 is first inserted into the second gear 20. The connection member 40 is then inserted into the through hole 25 with the shaft 11 extending into the connection member 40.

Figure 8:
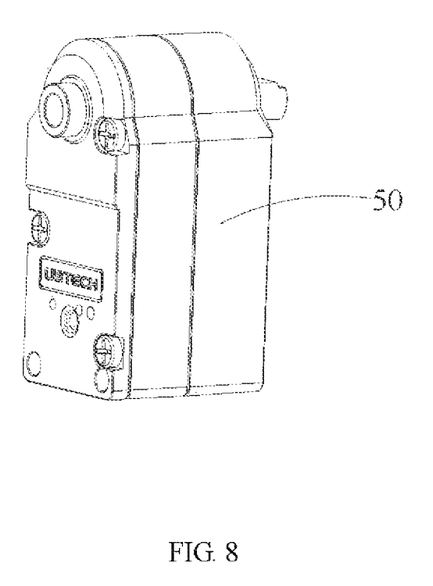
FIG. 8 is an isometric view of a servo including the overload protection assembly of FIG. 1.
Figure 9:
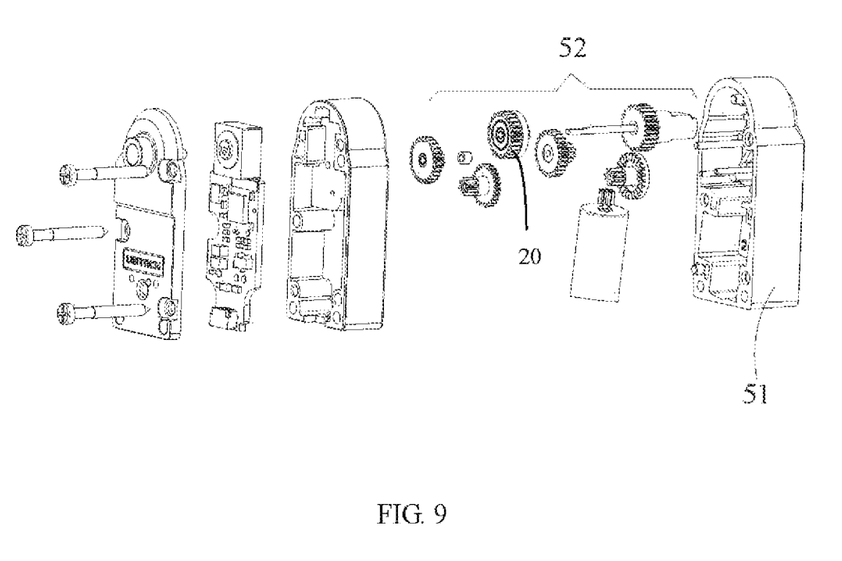
FIG. 9 is an isometric exploded view of the servo of FIG. 8.

Referring to FIGS. 8-9, in one embodiment, a servo 50 includes a housing 51 and a multi-stage gear transmission assembly 52 arranged within the housing 51. The multi-stage gear transmission assembly 52 includes the overload protection assembly as described above. The overload protection assembly is the fourth stage transmission in the multi-stage gear transmission assembly 52.

Figure 10:
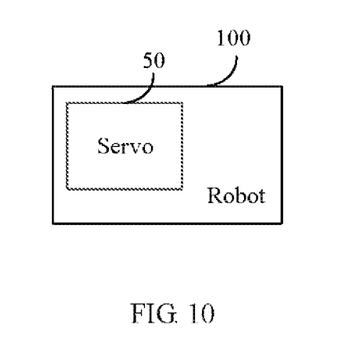
FIG. 10 is a schematic block diagram of a robot including the servo of FIG. 9.

Referring to FIG. 10, in one embodiment, a robot 100 includes a servo as described above. The overload protection assembly above is suitable for the locked-rotor protection when a motor rotates in a forward direction and the overload protection when a motor rotates in a reverse direction. The overload protection assembly can effectively avoid the damage caused by the instantaneous impact generated when the load torque on the a joint of a robot suddenly increases or by the impact generated in the moment when a robot falls down.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An overload protection assembly comprising:
   a first gear of a servo;
   a second gear of the servo, the second gear defining a receiving space; and
   an independently-formed clutch configured to coaxially couple the first gear to the second gear and transmit torque between the first gear and the second gear, the clutch comprising an elastic member arranged around the first gear and received in the receiving space;
   wherein the elastic member comprises a plurality of protrusions at a circumferential surface thereof, and a plurality of recesses are defined in a lateral surface of the receiving space, each of the protrusions being arc-shaped and defining a concavity, the protrusions are configured to be respectively engaged with corresponding ones of the recesses so as to couple the first gear to the second gear when a value of the torque is less than a preset value, and disengageable from the corresponding ones of the recesses so as to disconnect the first gear from the second gear when the value of the torque is more than the preset value;

wherein the clutch comprises an outer ring comprising an inner surface, and an inner ring connected to the inner surface, the outer ring and the inner ring corporately define two closed grooves therebetween.

2. The overload protection assembly according to claim 1, wherein a number of the protrusions is two, the lateral surface of the receiving space is a cylindrical surface, a maximum distance between the two protrusions is greater than a diameter of the receiving space.

3. The overload protection assembly according to claim 1, wherein each of the protrusions comprises an outer surface, the outer surface is connected to the circumferential surface of the clutch via an arc surface that is curved toward a center of the clutch.

4. The overload protection assembly according to claim 1, wherein the recesses are evenly arranged along a circumferential direction of the receiving space.

5. The overload protection assembly according to claim 1, wherein the first gear comprises a gear portion and a shaft connected to an end of the gear portion, a through hole is defined in a bottom of the receiving space, the inner ring is securely arranged around the shaft, the shaft pass through the clutch and received in the through hole.

6. The overload protection assembly according to claim 5, further comprising a connection member, wherein the through hole is a stepped hole, the connection member is securely arranged around the shaft of the first gear and is shaped according to the through hole to allow the connection member to fit in the through hole, and the connection member is configured to prevent the first gear from axially disengaging from the second gear.

7. A servo comprising an overload protection assembly, the overload protection assembly comprising:
a first gear;
a second gear, the second gear defining a receiving space; and
an independently-formed clutch configured to coaxially couple the first gear to the second gear and transmit torque between the first gear and the second gear, the clutch comprising an elastic member arranged around the first gear and received in the receiving space;
wherein the elastic member comprises a plurality of protrusions at a circumferential surface thereof, and a plurality of recesses are defined in a lateral surface of the receiving space, the protrusions are configured to be respectively engaged with corresponding ones of the recesses so as to couple the first gear to the second gear when a value of the torque is less than a preset value, and disengageable from the corresponding ones of the recesses so as to disconnect the first gear from the second gear when the value of the torque is more than the preset value;
wherein the clutch comprises an outer ring comprising an inner surface, and an inner ring connected to the inner surface, the outer ring and the inner ring corporately define two closed grooves therebetween.

8. A robot comprising a servo, the servo comprising an overload protection assembly, the overload protection assembly comprising:
a first gear;
a second gear defining a receiving space; and
an independently-formed clutch configured to coaxially couple the first gear to the second gear and transmit torque between the first gear and the second gear, the clutch comprising an elastic member arranged around the first gear and received in the receiving space;
wherein the elastic member comprises a plurality of protrusions at a circumferential surface thereof, and a plurality of recesses are defined in a lateral surface of the receiving space, the protrusions are configured to be respectively engaged with corresponding ones of the recesses so as to couple the first gear to the second gear when a value of the torque is less than a preset value, and disengageable from the corresponding ones of the recesses so as to disconnect the first gear from the second gear when the value of the torque is more than the preset value;
wherein the clutch comprises an outer ring comprising an inner surface, and an inner ring connected to the inner surface, the outer ring and the inner ring corporately define two closed grooves therebetween.

\* \* \* \* \*